US005482188A

United States Patent [19]

Lina

[11] Patent Number: 5,482,188

[45] Date of Patent: Jan. 9, 1996

[54] PRECOMPRESSION PUMP

[75] Inventor: Jean-Pierre Lina, Le Neubourg, France

[73] Assignee: Valois S.A., Le Neubourg, France

[21] Appl. No.: 256,549

[22] PCT Filed: Jan. 19, 1993

[86] PCT No.: PCT/FR93/00046

§ 371 Date: Sep. 14, 1994

§ 102(e) Date: Sep. 14, 1994

[87] PCT Pub. No.: WO93/13873

PCT Pub. Date: Jul. 22, 1993

[30] Foreign Application Priority Data

Jan. 20, 1992 [FR] France .................................. 92 00559

[51] Int. Cl.[6] ................................................ G01F 11/00

[52] U.S. Cl. .................................... 222/321.2; 222/321.4; 222/321.9; 222/341; 222/385

[58] Field of Search .................................. 222/320, 321, 222/340, 341, 383, 385; 239/333

[56] References Cited

U.S. PATENT DOCUMENTS

| | | | |
|---|---|---|---|
| 3,463,093 | 8/1969 | Pfeiffer et al. | 222/321 X |
| 4,087,025 | 5/1978 | Steiman | 222/321 |
| 4,228,931 | 10/1980 | Ruscitti et al. | 222/321 |
| 5,046,644 | 9/1991 | Cater | 222/321 |
| 5,147,073 | 9/1992 | Cater | 222/321 |

FOREIGN PATENT DOCUMENTS

| | | |
|---|---|---|
| 2097353 | 3/1972 | France . |
| 2403465 | 4/1979 | France . |

*Primary Examiner*—Joseph A. Kaufman
*Attorney, Agent, or Firm*—Sughrue, Mion, Zinn, Macpeak & Seas

[57] ABSTRACT

A precompression pump has a cylindrical housing 1 containing a slidable annular plunger 3 controlled by a push-rod 40 which slides in the plunger, and includes an outlet passage 41*a*, 42*a* leading to the housing via a side opening 42*b*. The plunger has an axial annular lip 4 that interacts with the push rod to block or clear the side opening, the push rod being connected to the plunger by a spring 47 which pushes the plunger back into a position in which the side opening is blocked. The spring urges the plunger towards an annular ram 44 which urges the lip 4 radially towards the push rod 40 by wedging it. The ram is configured to abut the plunger 3 outwardly of the lip and at a site distinct therefrom, thereby limiting movement of the ram 44 and the plunger towards each other, and thus limiting the radial force applied to the plunger lip 4.

11 Claims, 7 Drawing Sheets

43
43a
41f
41a
42f
41
40
10b
42a
10a
42
1c
31a
47
41c
42c
46
10c
41d
3d
31b
45
49
18
3
42b
3a
10
5
V
4
44a
V
44
44b
42d
4b
42e
42h
1
42g
1k
6
1g
48
1a
15
16
1f
2

44a
42
44
5
1
4

47
49
3

PRECOMPRESSION PUMP

BACKGROUND OF THE INVENTION

The present invention concerns an improved precompression pump particularly intended for spraying or dispensing a fluid, e.g. such as a perfume, a cosmetic or a pharmaceutical. A pump of this kind for a liquid or a semi-liquid is usually operated by a finger.

One specific type of manual precompression pump is described in document FR-2 403 465. That type of pump includes a cylindrical pump housing containing a slidable annular plunger controlled by a push rod which slides in said plunger and includes an outlet channel leading to the pump housing via a side opening, the plunger including a substantially axial annular lip that interacts with the push rod to block or clear said side opening, the push rod being connected to the plunger by a first resilient member which pushes the plunger back into a position in which said side opening is blocked, said first resilient member urging said plunger towards an annular ram which urges said lip radially towards the push rod by wedging it.

In that type of pump the radial force exerted on said lip of the plunger is not accurately controlled. This can eventually lead to deformation of the lip as the result of creep, to jamming of the lip into the side opening of the push rod, and possibly to tearing of the lip.

SUMMARY OF THE INVENTION

An object of the present invention is to solve this technical problem.

The present invention consists in a pump of the above type wherein the ram is further designed to abut the plunger outside said lip, thereby limiting the movement of the ram and the plunger towards each other, and thus limiting the radial force applied to said plunger lip.

In a first embodiment, corresponding to the pump described in above-mentioned document FR-2 403 465, the invention consists in a precompression pump including at least:

a cylindrical pump housing having first and second ends, an annular plunger slidable axially in said pump housing, a push rod slidable in said plunger and passing through said second end of the pump housing, said push rod extending axially between a first end outside the pump housing and a second end inside the pump housing, said push rod having a blind passage extending axially from the first end of the push rod to a side opening inside the pump housing, the plunger including an annular central lip extending partway towards the first end of the pump housing, said central lip being adapted to slide in sealed contact with at least one part of the push rod between said side opening and the second end of the push rod, said central lip being adapted to clear the side opening of the push rod when the plunger is displaced sufficiently far towards the first end of the push rod, a first resilient member mounted between the push rod and the plunger and urging said plunger towards the second end of the push rod, an annular ram disposed between the plunger and said first end of the pump housing, slidable in said pump housing and axially movable relative to the push rod, and a second resilient member urging the ram towards the second end of the pump housing so that the ram is pressed against the central lip of the plunger, said ram and said central lip having shapes such that the ram applies an inward radial clamping force to the central lip, by wedging it, whilst urging said central lip axially towards the second end of the pump housing, wherein the ram is further adapted to abut against the plunger outside the central lip, which limits movement of the ram and the plunger towards each other and thereby limits the radial clamping force applied to the central lip of the plunger.

The first end of the pump can include an inlet valve and the pump can further include a second resilient member which urges the push rod towards said second end of the pump housing.

In a second embodiment the invention consists in a precompression pump including at least:

a cylindrical pump housing having a first end fitted with an inlet valve and a second end, an annular plunger slidable axially in said pump housing, a push rod slidable in said plunger and passing through said second end of the pump housing, said push rod extending axially between a first end outside the pump housing and a second end inside the pump housing, said push rod having a blind passage extending axially from the first end of the push rod to a side opening inside the pump housing, the plunger including an annular central lip extending partway towards the first end of the pump housing, said central lip being adapted to slide in sealed contact with at least one part of the push rod between said side opening and the second end of the push rod, said central lip being adapted to clear the side opening of the push rod when the plunger is displaced sufficiently far towards the first end of the push rod, wherein the pump further includes:

an annular ram fastened to the push rod and disposed between the side opening of the push rod and the first end of the pump housing, and a first resilient member mounted between the push rod and the plunger and urging said plunger towards the ram so that the central lip of the plunger is pressed against the ram, the ram and the central lip having shapes such that the ram applies an inward radial clamping force to the central lip, by wedging it, and the ram is further adapted to abut against the plunger outside the central lip, which limits movement of the ram and the plunger towards each other and thereby limits the radial clamping force applied to the central lip of the plunger.

The ram can have an annular inside surface facing the central lip of the plunger, widening in the direction towards the second end of the pump housing. The central lip of the plunger can have an annular outside surface facing the ram and whose outside diameter increases in the direction towards the second end of the pump housing.

The ram can have a ring adapted to abut against the plunger outside the central lip and said ring can include radial cut-outs.

The part of the push rod on which the central lip of the plunger slides in sealed manner can be cylindrical. Alternatively, this part of the push rod can have a peripheral radially outward projection near the side opening of the push rod and the central lip of the plunger can have a cylindrical inside surface facing said projection.

If the first resilient member is a coil spring the plunger can include projections on which said coil spring bears.

The plunger can have at least one periphery sliding in sealed contact with a part of the push rod between the side opening of said push rod and its outside end.

BRIEF DESCRIPTION OF THE DRAWINGS

Other features and advantages of the invention emerge from a reading of the following description of various specific embodiments of the invention, given by way of non-limiting example with reference to the appended drawings.

In the drawings.

DESCRIPTION OF THE PREFERRED EMBODIMENTS

Components which are the same or similar in more than one figure are always identified by the same reference number.

The pumps described here are usually made from plastics material, the seals from elastomer material and the springs from metal.

Figure 1:
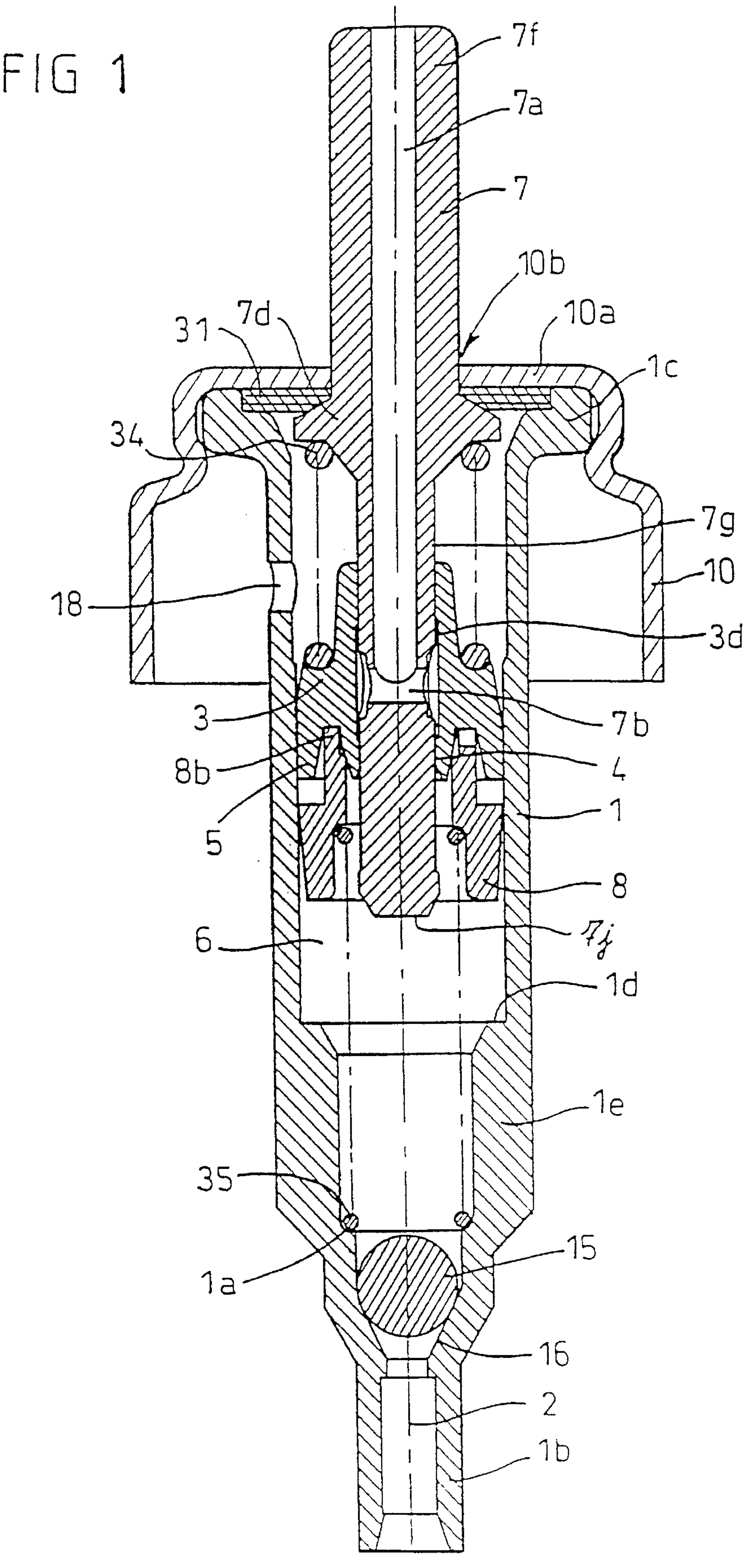
FIG. 1 is a view in longitudinal section of a first embodiment of pump in accordance with the invention, in a rest position.

The pump shown in FIG. 1 has a hollow cylindrical pump housing 1 with an axis of revolution 2. The pump housing 1 has an open upper end 1*c* and a neck 1*a* at the bottom extended downwardly by a inlet conduit 1*b* adapted to communicate with a reservoir of product to be dispensed (not shown), either directly or via a dip tube (not shown). The pump housing also has a small diameter lower part 1*e* extending from the neck 1*a* at the bottom towards the open end 1*c* of the pump housing, as far as an inside shoulder 1*d* of said housing.

The pump housing 1 delimits a pump chamber 6 which normally contains product to be dispensed and which communicates with the inlet conduit 1*b* via an inlet valve which can include, for example, a conical seat 16 formed in the pump housing between the neck 1*a* at the bottom and the inlet conduit 1*b* and a ball 15 adapted to be pressed onto and sealed to the conical seat 16 to block the inlet conduit 1*b* if the pressure increases in the pump chamber 6. On the other hand, if the pressure falls in the pump chamber 6 the ball 15 is lifted off its seat 16 and clears the inlet conduit 1*b*. The ball 15 can be a metal ball. Without departing from the scope of the invention, the inlet valve can be of any other known type.

The pump housing 1 can, for example, be mounted on the neck of the product reservoir by means of a metal cup 10 crimped onto the open upper end 1*c* of the pump housing, said metal cup having a bottom 10*a* with a central orifice 10*b*. An annular gasket 31 is disposed between the open end 1*c* of the pump housing and the bottom 10*a* of the metal cup. Without departing from the scope of the invention, the pump housing 1 can obviously be fixed to the reservoir by any other known means.

A hollow plunger concentric with the axis 2 slides in the pump housing 1. The plunger 3 includes an external skirt 5 whose periphery is in sealed contact with the pump housing 1, and a substantially cylindrical internal axial conduit 3*d*. In this example the plunger skirt 5 extends towards the neck 1*a* at the bottom of the pump housing but could also extend towards the bottom 10*a* of the cup 10 to abut the gasket 31 when the pump is in a rest position. The plunger 3 further includes an annular bottom lip 4 extending axially towards the neck 1*a* of the pump housing and disposed at the center of the plunger 3, around the inner conduit 3*d*.

A push rod 7 concentric with the axis 2 slides in the plunger 3. The push rod 7 passes through the orifice 10*b* in the metal cup and extends from a first end 7*j* inside the pump housing to a second end 7*f* outside the pump housing, which usually receives a button. The push rod 7 has a flange 7*d* extended towards the neck 1*a* at the bottom of the pump housing by a cylindrical part 7*g* whose outside diameter is substantially equal to the inside diameter of the plunger conduit 3*d*, said cylindrical part 7*g* of the rod sliding in and being sealed to said conduit 3*d*. A coil spring 34 is disposed between the flange 7*d* and the plunger 3. The push rod 7 is urged towards the open end 1*c* of the pump housing by the spring 34 and its upward travel is limited by abutment of the flange 7*d* against the gasket 31 and the bottom 10*a* of the cup. Thus, in the rest position the flange 7*d* of the push rod is pressed against and sealed to the gasket 31.

A blind axial passage 7*a* runs through the push rod 7 from its outer end 7*f* and communicate laterally with at least one orifice 7*b*. The orifice 7*b* is covered by the plunger conduit 3*a* when the pump is in the rest position, i.e. when no action is applied to the push rod 7. The conduit 3*d* can be in sealed contact with the rod 7 over the full height of said conduit. To reduce friction and improve sealing the conduit 3*d* advantageously includes two small inside diameter areas 3*b* and 3*c* respectively above and below the orifice 7*b* when the pump is in the rest position, the area 3*c* being formed inside the central bottom lip 4 and said areas 3*b* and 3*c* being in sealed contact with the rod 7.

An annular ram 8 concentric with the axis 2 is disposed under the central bottom lip 4 of the plunger and urged upwards by a coil spring 35 which is less stiff then the spring 34 which bears on the neck 1*a* at the bottom of the pump housing.

Figure 2:
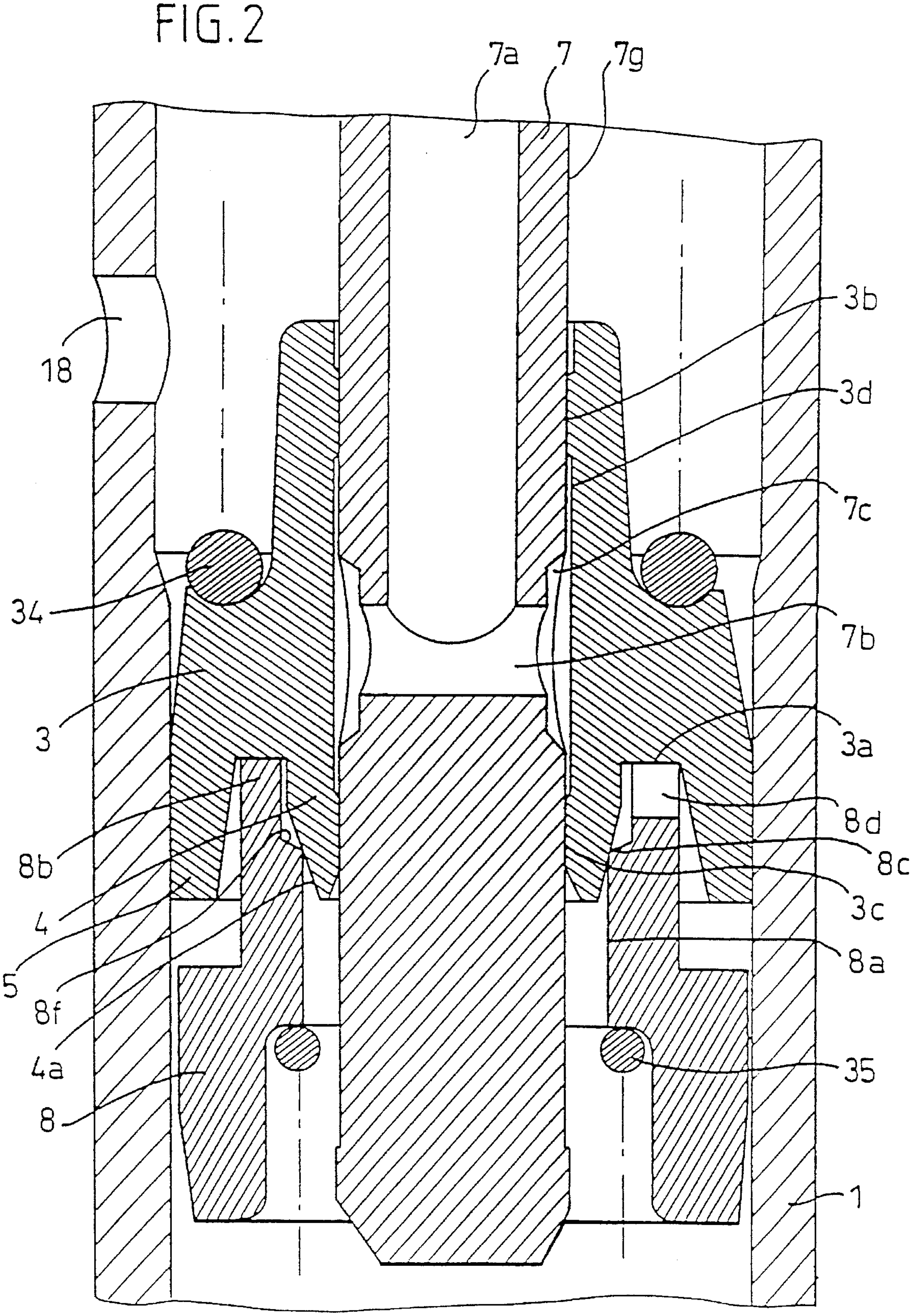
FIG. 2 is a part-sectional view to a larger scale of the pump from FIG. 1 in a rest position.

As shown in FIG. 2, the central bottom lip 4 of the plunger can have a frustoconical outside surface 4*a* whose outside diameter decreases in the downward direction from a maximal diameter to a minimal diameter. The plunger 3 can have a downward facing planar annular surface 3*a* extending radially between the central bottom lip 4 and the skirt 5. The ram 8 can have a cylindrical internal conduit 8*a* whose diameter is between the maximal and minimal diameters of the frustoconical surface 4*a*, said cylindrical internal conduit 8*a* being extended towards the plunger 3 by a ring 8*b* whose diameter is greater than the maximal diameter of the frustoconical surface 4*a*. The ring 8*b* advantageously includes radial cut-outs 8*d* whose function is explained below. The ram 8 includes between the cylindrical internal conduit 8*a* and the ring 8*b* an annular shoulder with an inner edge 8*c* which is preferably rounded to prevent sharp corners. The inner edge 8*c* is pressed against the periphery of the frustoconical outside surface 4*a* of the plunger 4 by the spring 35.

The inner edge 8*c* applies to the central bottom lip 4 an axial force towards the end 1*c* of the pump housing and a radial force towards the push rod 7, with a wedging effect due to the action of the springs 34 and 35. Also, the ring 8*b* abuts the annular surface 3*a* of the plunger and applies to the plunger an axial force towards the end 1*c* of the pump housing.

The ram 8 therefore pushes said central bottom lip 4 of the plunger elastically against the push rod 7, pushing up the plunger 3. However, the clamping effect of the ram 8 is limited by abutment of the ring 8*b* on the surface 3*a* of the plunger: this clamping effect is therefore accurately controlled and this prevents jamming of the lip 4 or deformation thereof by cold flow. Note also that the central bottom lip 4 is at a distance below the lateral orifice 7*b* of the push rod with the result that the radial clamping force applied to the lip 4 cannot cause said lip 4 to become jammed in the orifice 7*b* by virtue of extrusion of the material. The orifice 7*b* is advantageously bevelled or widened where it opens onto the rod 7. The wider part 7*c* of the orifice 7*b* can be formed by an upstanding portion of the mold in which the push rod 7 is made and the orifice 7*b* can itself be formed by a pin projecting into the mold during molding, with the result that the edges of the wider part 7*c* are sharply defined and free of molding defects, whereas the edges of the orifice 7*b* itself can feature minor molding defects due to the movement of the pin during molding. As the lip 4 slides on the edges of the wider part 7*c*, any such defects are of no consequence.

Figure 2A:
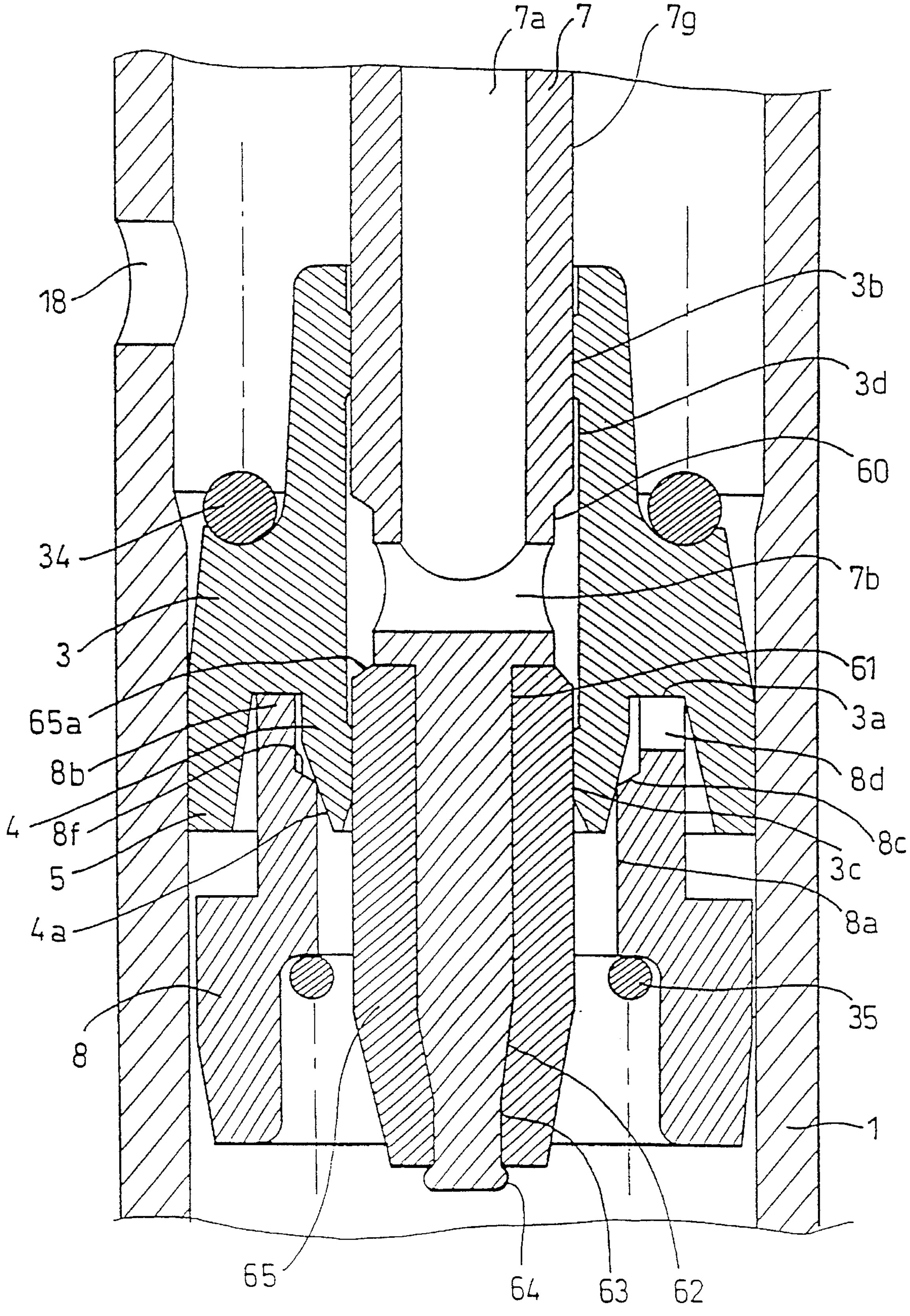
FIG. 2*a* is a view similar to FIG. 2 for a different embodiment of the invention.

To further improve the molding quality near the orifice 7*b* the push rod 7 can be made in two parts, as shown in FIG. 2*a*. In this variant the rod 7 has a smaller diameter first cylindrical part 60 which extends the cylindrical part 7*g* downwards. The lateral orifice 7*b* opens onto said part 60. This part 60 is extended downwards by a narrower second cylindrical part 61, followed by a frustoconical contraction 62 and then by a short cylindrical part 63 ending in an outward projection 64 at the lower end of the rod 7. A cylindrical annular ring 65 whose outside diameter is equal to the diameter of the cylindrical part 7*g* is nested with the parts 61, 62, 63 and clipped onto the projection 64. The ring 65 advantageously has a bevelled or rounded outside upper edge 65*a*. In this variant there is no possibility of poor molding quality where the plunger 3 slides on the rod 7 and the ring 65, especially at the level of the edge 65*a*.

This is how the pump works:

When a user presses the push rod 7, usually through a button (not shown), said push rod 7 is pushed down into the pump chamber 6, which compresses the spring 34, which in turn moves the plunger 3 downwards. This decreases the volume of the pump chamber 6 and causes a pressure rise therein which closes the inlet valve 15, 16. This isolates the pump chamber 6. The pump chamber 6 usually contains the product to be sprayed or dispensed. As the product it contains is incompressible, the plunger 3 cannot move down in the pump chamber: accordingly, only the push rod 7 moves down, compressing the spring 34 and possibly causing the plunger 3 to rise slightly in the pump housing. As soon as the orifice 7*b* moves below the bottom lip 4 of the plunger 3, the pressurized product in the pump chamber exits via the orifice 7*b* and the axial passage 7*a* in the push rod. The product is therefore expelled when the pressure in the pump chamber is high enough to exert a force on the plunger 3 which, in combination with the force produced by the return spring 35, counterbalances the force of the spring 34 in the position shown in FIG. 3, i.e. when the lip 4 clears the orifice 7*b*. Note that the cut-outs 8*d* allow the pressure in the pump chamber 6 to be applied to most of the surface of the plunger when the ring 8*b* bears against the surface 3*a* of said plunger. The cut-outs 8*d* also facilitate extraction of the air contained in the pump chamber when the pump is primed, preventing this air from being trapped under the plunger. The plunger 3 then moves down in the pump housing 1 as the volume of product in the pump chamber 6 is reduced, compressing the spring 35, until the ram 8 abuts against the shoulder 1*d*, at which point the downward movement of the push rod 7 and the plunger 3 stops. Alternatively, and without departing from the scope of the present invention, the ram 8 could abut against any member fastened to the pump housing 1.

Figure 3:
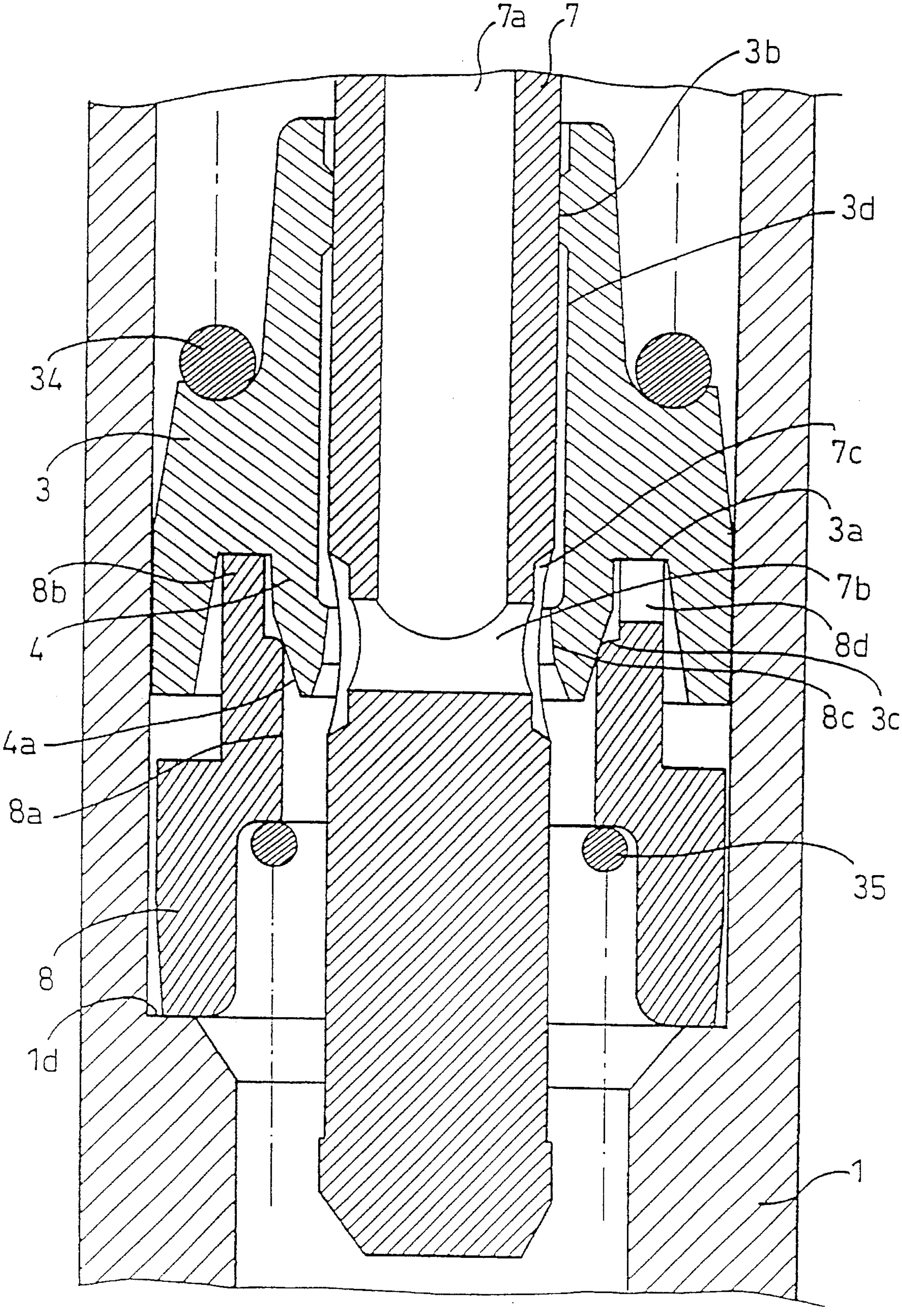
FIG. 3 is a part-sectional view to a larger scale of the pump from FIG. 1 in a ram abutment position.

In this abutment position, shown in FIG. 3, the force the user applies to the push rod can be high. Likewise, when the pump is assembled in a machine it can find itself in this abutment position and the machine can apply a high force to the push rod. In this position of mechanical equilibrium the force applied to the push rod is equal to the reaction applied to the ram 8 by the shoulder 1*d* which is equal to the force applied to the plunger 3 by the ram 8. The force applied to the plunger 3 by the ram 8 can therefore be high but it is taken by the annular surface 3*a* and the central bottom lip 4, which limits the force on the frustoconical lower part 4*a* and thus also limits the radial clamping force applied to said central bottom lip 4 towards the push rod 7. Also, the axial position of the ram 8 relative to the plunger is precisely set by abutment of the ring 8*b* of the ram against the annular surface 3*a* of the plunger, so that radial deformation of said frustoconical lower part 4*a* towards the push rod 7 is limited. This eliminates the risk of permanent deformation of said frustoconical lower part 4*a* by the radial force exerted by the ram.

When the user releases the push rod 7 the stronger spring 34 resumes its original shape first, pushing the push rod 7 up relative to the plunger 3, with the result that the lip 4 of the plunger 3 blocks the outlet orifice 7*b*, which isolates the pump chamber 6.

The spring 35 expands after the spring 34, pushing up the plunger 3 and the ram 8. This reduces the pressure in the pump chamber 6 and therefore opens the inlet valve 15, 16, enabling the product in the reservoir to enter the pump chamber 6 as the plunger 3 rises, until it reaches the rest position.

In the embodiment shown the pump housing 1 has an air vent 18 in it near the upper end 1*c* of the pump housing. When the push rod is depressed the flange 7*d* is no longer in contact with the gasket 31 which means that air can pass between the push rod 7 and the gasket 31. As the plunger rises, when product is aspirated from the reservoir into the pump chamber 6 a volume of air equal to the volume of product drawn into the pump chamber can therefore pass into the reservoir through the air vent 18.

Without departing from the scope of the present invention the air vent 18 can be dispensed with.

Figures 4, 5, 6:
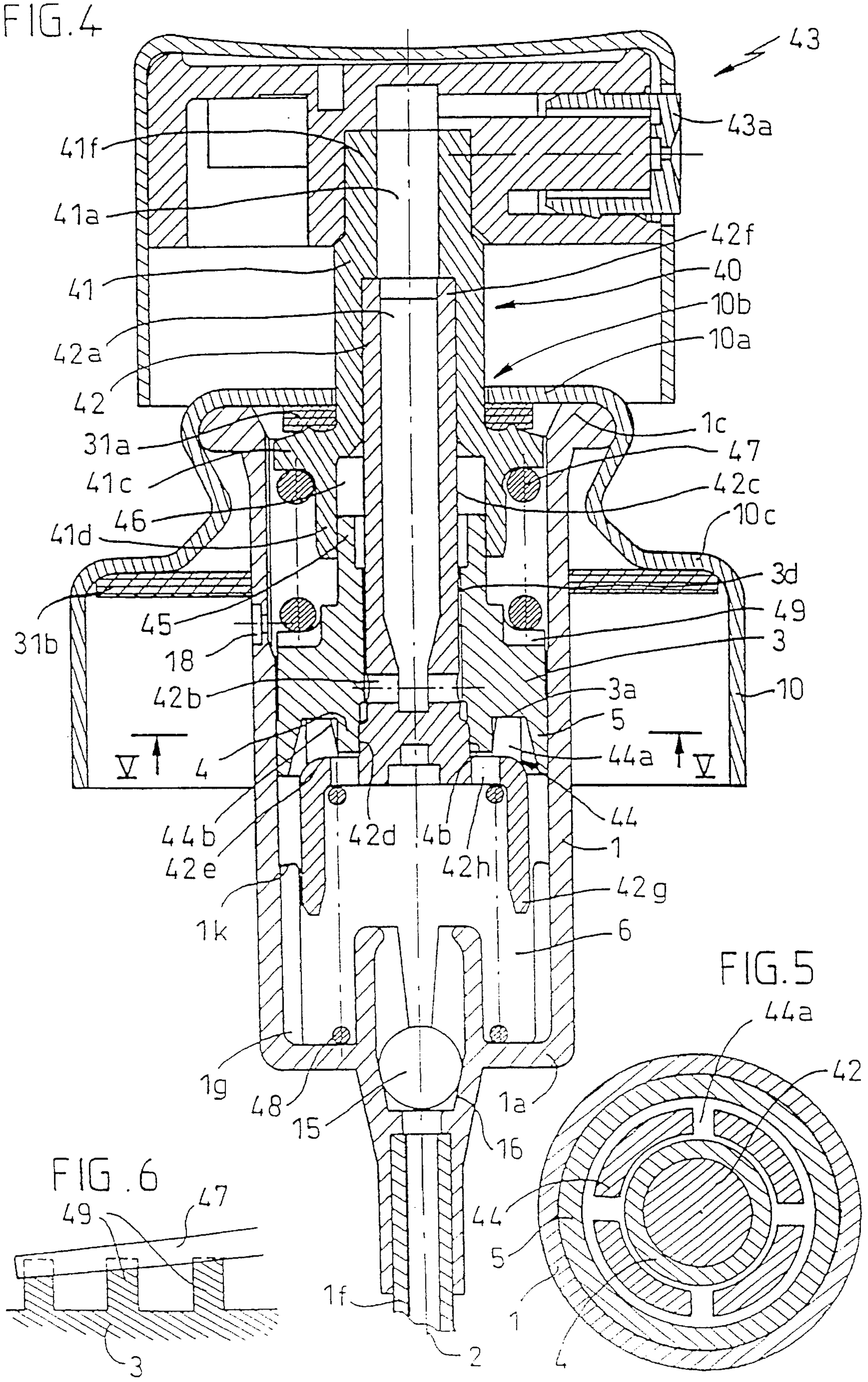
FIG. 4 is a view in longitudinal section of a second embodiment of pump in accordance with the invention, in a rest position.
FIG. 5 is a view in cross-section on the line V—V in FIG. 4.
FIG. 6 is a developed view showing the precompression spring bearing on the bearing ribs of the plunger of the FIG. 4 pump, the deformation of the ribs being exaggerated.

FIGS. 4 and 5 show a second embodiment of the pump of the invention. The pump shown in FIGS. 4 and 5 is an improvement on the pump shown in FIG. 7*b* of European patent application No. 91 403 023.4, which had not been published on the filing date of this application.

As before, the pump includes a hollow cylindrical pump housing 1 with an axis of revolution 2. The pump housing 1 has an open upper end 1*c* and a neck 1*a* at the bottom which is extended by an inlet conduit adapted to communicate with a reservoir containing product to be dispensed (not shown), either directly or via a dip tube 1*f.*

The pump housing 1 delimits a pump chamber 6 which normally contains product to be dispensed and which communicates with the inlet conduit via an inlet valve. The valve can, for example, include a conical seat 16 and a ball 15 adapted to be sealingly engaged on the conical seat 16 to block the inlet conduit if the pressure rises in the pump chamber 6. If the pressure in the pump chamber 6 falls the ball 15 is lifted off its seat 16 and clears the inlet conduit. Without departing from the scope of the present invention, the inlet valve can be of any other known type.

As before, the pump housing 1 can be mounted on the neck of the product reservoir by means of a metal cup 10 crimped to the open upper end 1*c* of the pump housing, said metal cup having a bottom 10*a* with a central orifice 10*b*. In the FIG. 4 example, the metal cup 10 also has a wider portion 10*c* and an annular gasket 31*b* between the wider portion 10*c* and the neck of the reservoir.

A hollow plunger 3 concentric with the axis 2 slides in the pump housing 1. The plunger 3 has an external skirt 5 whose periphery is in sealed contact with the pump housing 1, and an internal axial conduit 3*d*. The plunger 3 also has an annular bottom lip 4 extending axially towards the neck 1*a* of the pump housing and which is disposed at the center of the plunger 3, around the internal conduit 3*d*.

The pump further includes an axial push rod 40 concentric with the axis 2 and which passes through the orifice 10*b* in the metal cup. The push rod 40 is in two pieces and includes an external sleeve 41 fixed to an internal core 42 by means of a force fit or other means. The external sleeve 41 is concentric with the axis 2. It passes through the central orifice 10*b* of the metal cup 10 and extends out of the pump housing 1 as far as an outer or upper end 41*f* which can receive a button 43. The button 43 operates the pump and the product is dispensed through it. As shown in FIG. 4, the button can have a side outlet, optionally fitted with a spray nozzle 43*a*. Without departing from the scope of the present invention, the button 43 can have any other known shape. The sleeve 41 has an axial passage 41*a* through it. From the outer end 41*f* the sleeve 41 extends into the pump housing as far as a flange 41*c* projecting substantially radially outwards. The sleeve 41 can also have a cylindrical skirt 41*d* extending towards the neck 1*a* at the bottom of the pump housing from the flange 41*c*. The outside diameter of the cylindrical skirt 41*d* is less than the diameter of the flange 41*c* and its inside diameter is greater than the outside diameter of the internal core 42.

The internal core 42 has a first cylindrical part 42*c* extending from an upper end 42*f* towards the neck 1*a* at the bottom of the pump housing. The upper end 42*f* is nested in the sleeve 41. Said first cylindrical part 42*c* of the core 42 is extended towards the neck 1*a* at the bottom of the pump housing by a larger diameter second cylindrical part 42*d*. A blind axial passage 42*a* passes through the core 42 from the upper end 42*f*, communicates with the passage 41*a* in the external sleeve 41 and opens laterally through at least one orifice 42*b* in the first cylindrical part 42*c*, near the second cylindrical part 42*d*. Said first cylindrical part 42*c* of the core 42 slides in the conduit 3*d* inside the plunger, but is not sealed to the latter. The central bottom lip 4 of the plunger is cylindrical and has a cylindrical inside surface 4*b* having an inside diameter substantially equal to the outside diameter of the second cylindrical part 42*d* of the core 42. The lip 4 can therefore slide on said second cylindrical part 42, to which it is sealed. The plunger 3 also has a cylindrical part 45 extending axially towards the end 1*c* of the pump housing, around the core 42. Said cylindrical part 45 has an outside diameter substantially equal to the inside diameter of the skirt 41*d* of the sleeve 41 so that said cylindrical part 45 slides on the inside of the skirt 41*d*, to which it is sealed. The cylindrical part 45 could advantageously be replaced with a frustoconical part widening slightly in the upward direction, in order to improve the seal. To limit or eliminate the effects of cold flow of the part 45, which could degrade the seal in the course of time, said part 45 could be reinforced by ribs (not shown) projecting radially inwards and sliding against the second cylindrical part 42*c* of the core 42. The cylindrical part 45 and the skirt 41*d* thus define an annular suction chamber 46 around the core 42 and communicating with the orifice 42*b* because the plunger 3 is not in sealed contact with the first cylindrical part 42*c* of the core 42. The benefit of the suction chamber is explained below.

From the second cylindrical part 42*d* the core 42 is extended radially outwards by a wider portion 42*e* which can be extended towards the neck 1*a* at the bottom of the pump housing by a skirt 42*g* . In the example shown in FIG. 4, the skirt 42*g* cooperates with axial ribs 1*g* inside the pump housing 1 and extending some distance from the neck 1*a* at the bottom of the pump housing to guide movement of the core 42 inside the pump housing. The wider portion 42*e* of the core includes a ram or ring 44 extending axially from said wider portion towards the plunger 3. This ring is advantageously interrupted by radial cut-outs 44*a*, as shown in FIG. 5.

A precompression spring 47 between the flange 41*c* on the sleeve 41 and the plunger 3 pushes said plunger 3 towards the ring 44. As in the FIG. 1 example, the plunger 3 has a radial annular surface 3*a* between the skirt 5 and the lip 4. The precompression spring 47 presses said annular surface 3*a* against the ring 44. The ring 44 also has a frustoconical inside surface 44*b* which widens towards the upper end 1*c* of the pump housing and which applies a radial clamping or wedging force to the lip 4 when the ring 44 is abutted against the surface 3*a* of the plunger. This strengthens the seal at the point of contact between the lip 4 and the second cylindrical part 42*d* of the core 42, while the clamping force exerted by the ring 44 is accurately controlled by virtue of abutment of said ring 44 against the surface 3*a* of the plunger, which prevents permanent deformation and jamming of the lip 4 of the plunger. In the FIG. 4 example, the wider bottom part 42*e* of the core 42 has holes 42*h* through it to facilitate expulsion of the product, but without departing from the scope of the present invention these holes could be dispensed with.

Finally, the pump includes a return spring 48 between the wider part 42*e* of the core and the neck 1*a* at the bottom of the pump housing. The return spring 48 urges the core 42 and therefore the whole of the push rod 40 towards the open end of the pump housing. The return spring 48 therefore presses the flange 41*c* of the sleeve 41 against the bottom 10*a* of the metal cup 10. An annular seal 31*a* is disposed between the flange 41*c* and the bottom 10*a* of the cup 10.

The plunger 3 advantageously includes substantially radial crenellations or ribs 49 on which the precompression spring 47 bears. If the precompression spring 47 is a coil spring its end turns when at rest can be in a plane that is not perpendicular to the axis 2. In this case the spring 47 would tend to deform the plunger, or at least the external skirt 5 of the plunger, by imposing on it some degree of skewing, i.e. some degree of rotation about an axis perpendicular to the axis 2, all the more easily when the push rod 40 is in two parts nested one inside the other. However, as the spring 47 bears on the ribs 49 and not on a continuous surface, a high force is exerted locally by the spring 47 on the ribs 49, with the result that said ribs 49 deform as shown in FIG. 6 and allow the spring 47 to engage to a greater or lesser degree in said ribs 49, in the direction towards the plunger 3. Accordingly, even if the end turn of the spring 47 lies in a plane that is not perpendicular to the axis 2, because of their deformation the ribs 49 are in contact with the spring 47 over substantially all of the perimeter of its end turn. The force exerted by the spring 47 is therefore distributed over substantially all of the perimeter of the plunger 3, which is therefore not deformed. This guarantees a good and durable seal at the point of contact of the skirt 5 of the plunger 3 and the pump housing 1. Note also that the ring 44, which abuts the surface 3*a* of the plunger, also tends to limit deformation of the plunger 3 due to the action of the spring 47, by holding said plunger in position. These advantages enable production of a pump having a plunger with a small axial dimension in that a long plunger is not needed to secure proper guiding of the plunger in the pump housing to guard against skewing of the plunger. The total height of the pump can therefore be reduced, which constitutes a major technical advantage.

This is how the FIG. 4 pump works: when a user depresses the button 43 the push rod 40 moves down inside the pump housing, which pushes down the plunger 3, because of the precompression spring 47. The volume of the pump chamber 6 therefore decreases which increases the pressure which presses the ball 15 against its seat 16, isolating the pump chamber 6. As the product in the pump chamber is usually incompressible, the plunger 3 cannot move downwards in the pump chamber: thus only the push rod 40 moves downwards and the plunger 3 may even rise slightly inside the pump housing. During this movement the return spring 48 is compressed, and likewise the precompression spring 47. When the pressure in the pump chamber 6 is sufficient to counterbalance the force of the precompression spring 47, the plunger 3 slides on the push rod 40 towards the upper end 1*c* of the pump housing with the result that the lip 4 of the plunger is disengaged from the second cylindrical part 42*d* of the core 42 and the pump chamber communicates with the orifice 42*b* through which the product is expelled. During this sliding of the plunger 3, the volume of the suction chamber 46 decreases. Note that the seal between the lip 4 of the plunger and the second cylindrical part 42*d* of the core 42 is not broken as long as said lip 4 slides on said cylindrical part 42*d*. The value of the pressure in the pump chamber at which the product is expelled is therefore determined by the force exerted by the spring 47 at the end of sliding of the lip 4 on the cylindrical part 42*d*, and this force is greater than the force exerted by the precompression spring 47 on the plunger 3 at rest. This is advantageous in that the resting force exerted by the spring 47 on the plunger 3 can be reduced slightly, which further reduces the possibility of deformation of the plunger 3 by the spring 47.

Note also that the lateral orifice 42*b* in the core 42 is in the first cylindrical part 42*c* of said core, on which the plunger 3 slides without a seal. Thus even if there are minor molding defects at the edges of the orifice 42*b*, these do not impede sliding of the plunger 3 on the core 42. Also, as there is some clearance between the plunger 3 and the first cylindrical part 42*c* of the core 42, the rate at which the product is expelled is increased.

The downward movement of the plunger 3 continues until the skirt 5 of the plunger 3 abuts the upper ends 1*k* of the ribs 1*g* on the pump housing. When the user releases the button 43 the return spring 48 pushes the push rod 40 towards the end 1*c* of the pump housing and at the same time the precompression spring 47 holds the skirt 5 abutted against the ends 1*k* of the ribs 1*g* with the result that the central bottom lip 4 of the plunger again covers the second cylindrical part 42*d* of the core 42 and the ring 44 again applies a radial clamping force to said lip 4 of the plunger. During this movement of the plunger the volume of the suction chamber 46 increases and as the plunger slides without a seal on the first cylindrical part 42*c* of the core 42, the suction chamber 46 communicates with the orifice 42*b* with the result that the increase in the volume of the suction chamber 46 causes suction in the axial passage 42*a* of the core 42, in the passage 41*a* of the sleeve 41 and in the outlet passage of the button 43. This prevents product inside the button 43 leaking out when the device is in storage, especially when the product is a semi-liquid.

Alternatively, the return spring 48 of the push rod 40 could be mounted outside the pump housing, for example between a flange on the sleeve 41 and the bottom 10*a* of the cup 10.

Figure 7:
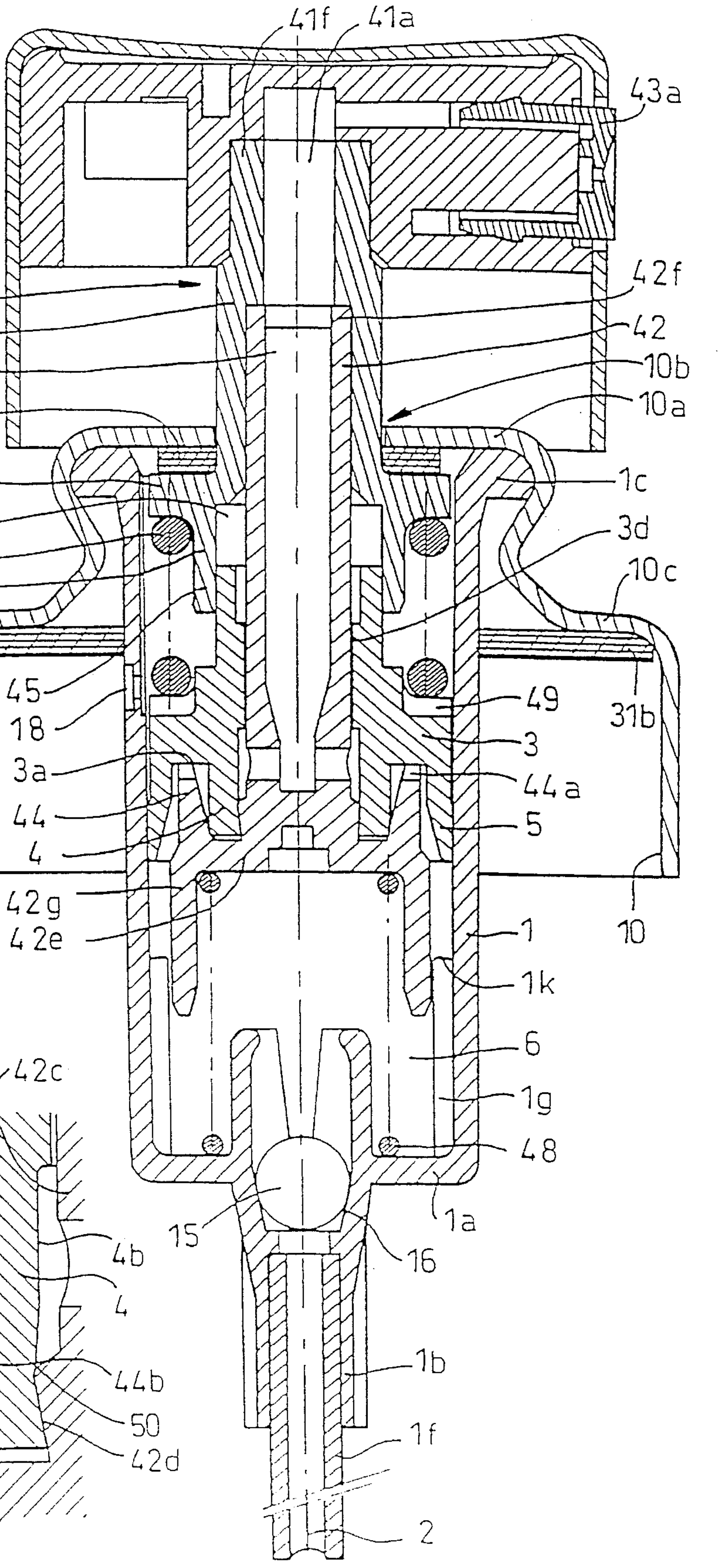
FIG. 7 is a view in longitudinal section of a variant of the FIG. 4 pump.
Figure 8:
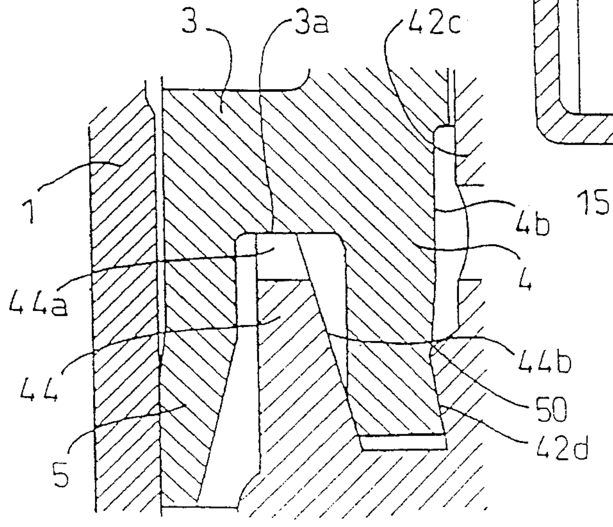
FIG. 8 shows part of FIG. 6 in more detail.

FIGS. 7 and 8 show a variant of the pump from FIGS. 4 to 6. The construction of the pump from FIGS. 7 and 8 is very similar to that from FIGS. 4 to 6 and is not described again in detail at this point. It differs from the pump of FIGS. 4 to 6 in that the wider part 42*e* of the core 42 has no orifice 42*h* and also in that the wider lower part 42*d* of the core 42 is no longer cylindrical, but frustoconical, widening towards the top. Said part 42*d* of the core 42 therefore forms an annular rim 50 projecting around the core 42. Accordingly, when the frustoconical surface 44*b* of the ring 44 applies the radial clamping force to the lip 4 of the plunger, said annular rim 50 exerts on the lip 4 a force concentrated on a peripheral line inside the lip 4. This improves the seal at the point of contact between said lip 4 and the part 42*d*.

Figure 9:
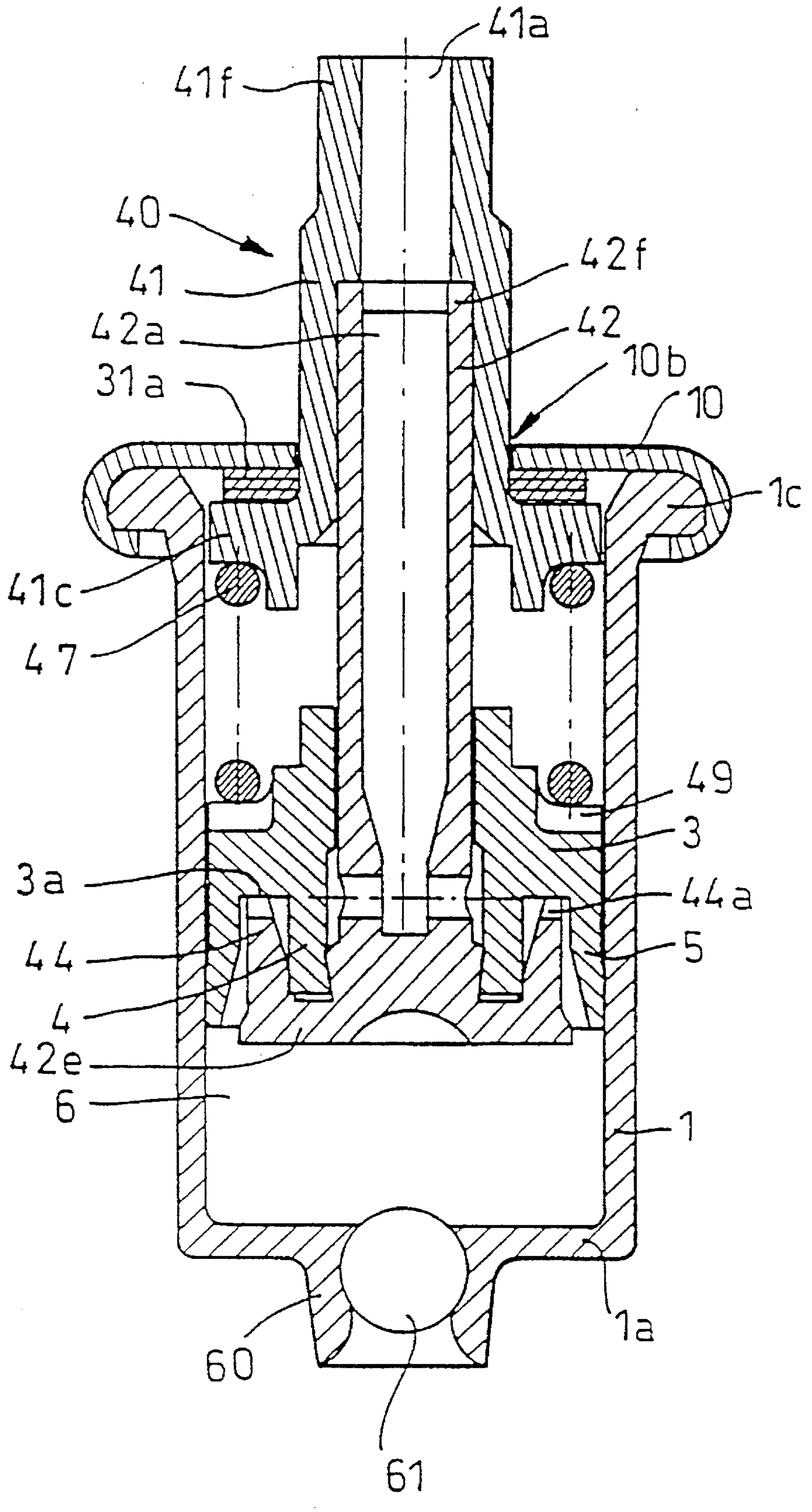
FIG. 9 is a view in longitudinal section of a variant of the FIG. 7 pump for spraying a single dose of product.

The construction of the FIG. 9 pump is very similar to that of FIG. 7 and is therefore not described again in detail at this point. This pump differs from the FIG. 7 pump in that it is designed to spray or dispense a single dose of product initially contained in the pump chamber 6. The FIG. 9 pump usually has no air vent 18. Nor does it include the suction chamber 46 of the FIG. 7 pump, and the plunger 3 is therefore sealed to the core 42 of the push rod 40 where it slides on the latter. However, the suction chamber could be retained, as in FIG. 7, although in this context the suction effect is of little benefit. Finally, the FIG. 9 pump does not include the inlet valve 15, 16 or the inlet conduit 1*b*, but only a filling passage 60 in the end 1*a* of the pump housing, closed by a ball or other equivalent means.

To simplify the foregoing description, reference is made to a pump that is vertical, with the push rod directed upwards, which is the most usual position for such devices: without departing from the scope of the present invention, the pump can of course be used in other positions.

I claim:

1. A precompression pump, comprising: a cylindrical pump housing (1) containing a slidable annular plunger (3) controlled by a push-rod (7, 40), said push rod being slidably disposed in said plunger and including an outlet passage (7*a*, 41*a*, 42*a*) leading to the pump housing via a side opening (7*b*, 42*b*), the plunger including a substantially axial, annular inner lip (4) that interacts with the push rod to block or clear said side opening, the push rod being connected to the plunger by a first resilient member (34, 47) which urges the plunger into a position whereat said side opening is blocked, said first resilient member urging said plunger towards an annular ram (8, 44) which urges said lip (4) radially inwardly towards the push rod (7, 40) by wedging it, wherein the ram is configured to abut the plunger outwardly of said lip and at a site distinct therefrom to limit movement of the ram and plunger towards each other, and to attendantly limit a radial force applied to said plunger lip.

2. A precompression pump, comprising:

a cylindrical pump housing (1) having first and second ends (1*a*, 1*c*), an annular plunger (3) slidable axially in said pump housing, a push rod (40) slidable in said plunger and passing through said second end (1*c*) of the pump housing, said push rod extending axially between a first end (41*f*) outside the pump housing and a second end (42*e*) inside the pump housing, said push rod having a blind passage (41*a*, 42*a*) extending axially from the first end (41*f*) of the push rod to a side opening (42*b*) inside the pump housing, the plunger including an annular central lip (4) extending partway towards the first end (1*a*) of the pump housing, said central lip being adapted to slide in sealed contact with at least one part (42*d*) of the push rod between said side opening (42*b*) and the second end (42*e*) of the push rod, said central lip being adapted to clear the side opening of the push rod when the plunger is displaced sufficiently far towards the first end (41*f*) of the push rod, an annular ram (44) fastened to the push rod (40) and disposed between the side opening (42*b*) of the push rod and the first end (1*a*) of the pump housing, and a first resilient member (47) mounted between the push rod and the plunger and urging said plunger towards the ram so that the central lip (4) of the plunger is pressed against the ram, the ram and the central lip having shapes such that the ram applies an inward radial clamping force to the central lip by wedging it, wherein the ram (44) is configured to abut against the plunger (3) outwardly of the central lip (4) and at a site distinct therefrom to limit movement of the ram and plunger towards each other, and to attendantly limit the radial clamping force applied to the central lip of the plunger.

3. A pump according to claim 2, wherein said first end of the pump includes an inlet valve (15, 16) and the pump further includes a second resilient member (48) which urges the push rod (40) towards said second end (1*c*) of the pump housing.

4. A precompression pump, comprising:

a cylindrical pump housing (1) having a first end (1*a*) fitted with an inlet valve (15, 16) and a second end (1*c*), an annular plunger (3) slidable axially in said pump housing, a push rod (7) slidable in said plunger and passing through said second end (1*c*) of the pump housing, said push rod extending axially between a first end (7*f*) outside the pump housing and a second end (7*j*) inside the pump housing, said push rod having a blind passage (7*a*) extending axially from the outside end (7*f*) of the push rod to a side opening (7*b*) inside the pump housing, the plunger including an annular central lip (4) extending partway towards the first end (1*a*) of the pump housing, said central lip being slidably disposed in sealed contact with at least one part (7*g*) of the push rod between said side opening (7*b*) and the second end (7*j*) of the push rod, said central lip (4) being adapted to clear the side opening of the push rod when the plunger (3) is displaced sufficiently far towards the first end (7*f*) of the push rod, a first resilient member (34) disposed between the push rod and the plunger for urging said plunger towards the second end (7*j*) of the push rod, an annular ram (8) disposed between the plunger (3) and the first end (1*a*) of the pump housing, slidable in said pump housing, and axially mobile relative to the push rod (40), and a second resilient member (35) urging the ram (8) towards the second end (1*c*) of the pump housing so that the ram is pressed against the central lip (4) of the plunger, said ram and said central lip (4) having shapes such that the ram applies an inward radial clamping force to the central lip by wedging it, simultaneously urging said central lip axially towards the second end (1*c*) of the pump housing, wherein the ram (8) is configured to abut against the plunger (3) outwardly of the central lip (4) and at a site distinct therefrom to limit movement of the ram and plunger towards each other, and to attendantly limit the radial clamping force applied to the central lip of the plunger.

5. A pump according to claims 2 or 4, wherein the ram (44) has an annular inside surface (44*a*) facing the central lip (4) of the plunger, widening in the direction towards the second end (1*c*) of the pump housing.

6. A pump according to claims 2 or 4, wherein the central lip (4) of the plunger has an annular outside surface (4*a*) facing the ram (8) and whose outside diameter increases in the direction towards the second end (1*c*) of the pump housing.

7. A pump according to claims 2 or 4, wherein the ram ( 8, 44 ) has a ring (8*b*, 44) adapted to abut against the plunger (3) outside the central lip (4) and said ring includes radial cut-outs (8*d*, 44*a*).

8. A pump according to claims 2 or 4, wherein a part (7, 42*d*) of the push rod on which the central lip (4) of the plunger slides in sealed manner is cylindrical.

9. A pump according to claim 2, wherein the part (42*d*) of the push rod on which the central lip (4) of the plunger slides in sealed manner has a peripheral radially outward projection (50) near the side opening (42*b*) of the push rod (40) and the central lip (4) of the plunger has a cylindrical inside surface (4*b*) facing said projection (50).

10. A pump according to claim 2, wherein the first resilient member (47) is a coil spring and the plunger (3) includes projections (49) on which said coil spring (47) bears.

11. A pump according to claim 4, wherein the plunger has at least one periphery (3*b*, 4*a*) sliding in sealed contact with a part of the push rod between the side opening (7*b*) of said push rod and its outside end (7*f*).

* * * * *